May 26, 1936.  T. A. EDISON, JR  2,042,215
ELECTRIC TOASTER
Filed May 29, 1934    2 Sheets-Sheet 1

INVENTOR
Thomas A. Edison Jr.
By Henry Lanahan
ATTORNEY

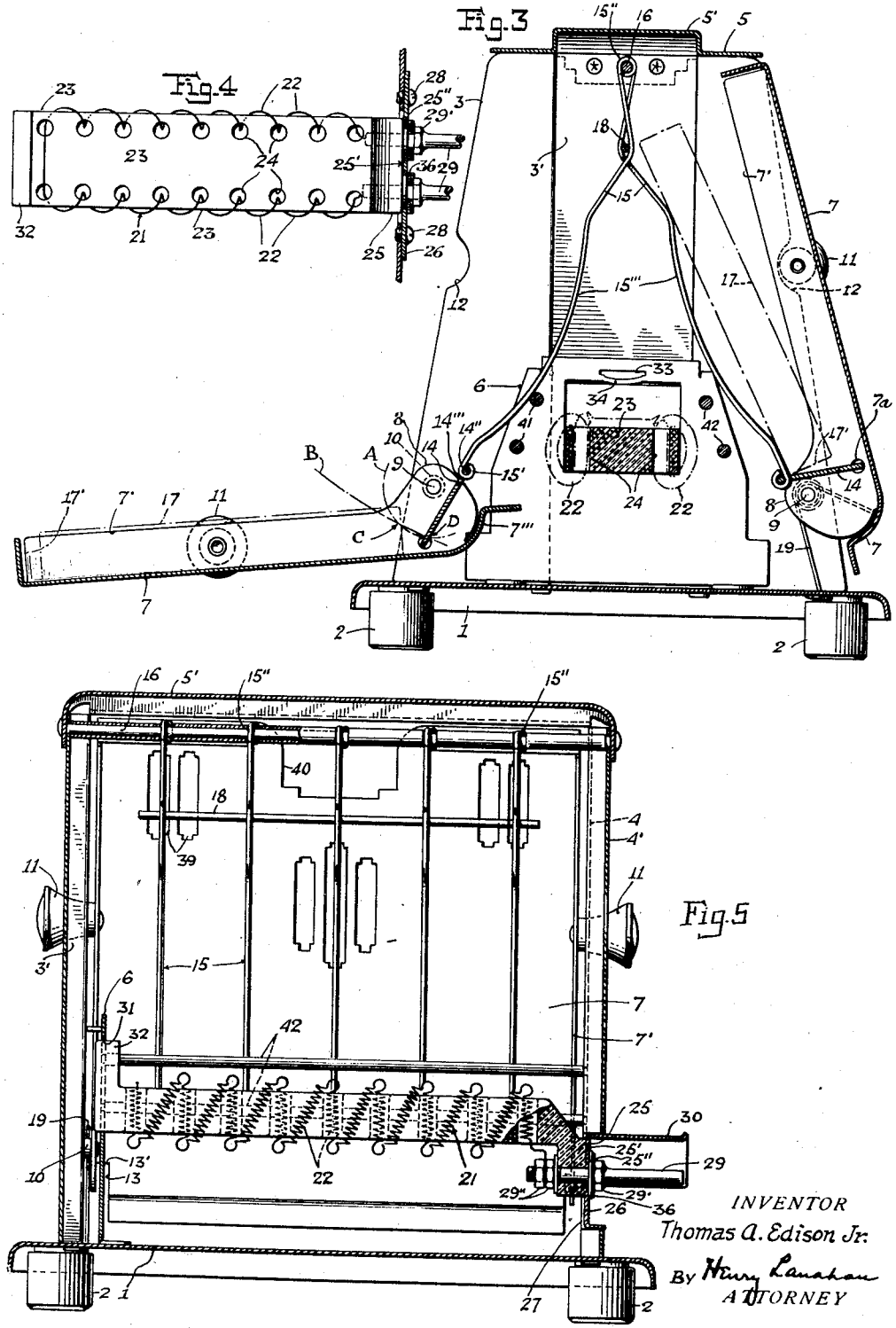

Patented May 26, 1936

2,042,215

UNITED STATES PATENT OFFICE 2,042,215

ELECTRIC TOASTER

Thomas A. Edison, Jr., East Orange, N. J., assignor to Thomas A. Edison, Incorporated, West Orange, N. J., a corporation of New Jersey Application May 29, 1934, Serial No. 728,096

9 Claims. (Cl. 219—19)

This invention relates to improvements in electric toasters, for the toasting of slices of bread and the like.

An object of the invention is the provision of a toaster which is of simplified and economical construction, while adapted to perform its toasting function uniformly and quickly.

A further object is to provide a toaster from which the heating unit may be easily and speedily detached, for purposes of replacement, repair and the like.

A further object is the provision of an improved and simplified electric heating unit for such a toaster.

Another object of the invention is the provision of improvements in the structure and operation of the toast-positioning portions of the toaster.

Still another object of the invention is the provision, in a toaster of the class described, of members each adapted to perform a plurality of functions, whereby a high degree of simplicity is attained.

Other and allied objects will more full appear from the following description and the appended claims.

In such description reference is had to the accompanying drawings, of which:

Fig. 3 is a vertical sectional view taken parallel to the ends of the toaster, and looking in the same direction as Fig. 2, showing one of the toast covers open;

Fig. 4 is a plan view, with a few portions shown in section, of the removable heating unit embodied in my invention; and Fig. 5 is a view similar to Fig. 1, but with the forwardly disposed toast cover removed and with certain portions shown in section.

Figure 1:
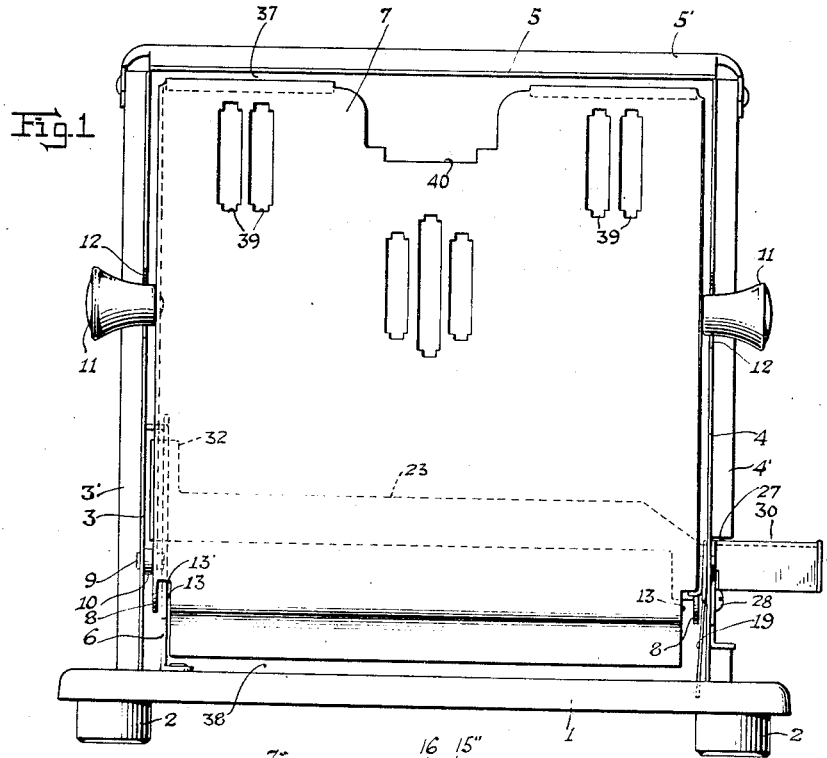
Figure 1 is a side elevational view of a toaster embodying my invention.

Referring now to the drawings, the toaster shown has a base 1. To the top of the base 1 are secured end members, comprising the end casings 3 and 4, and a vertical end plate 6 spaced inwardly a slight distance from the end casing 3. Between the tops of the end casings is secured the top casing 5. The three casings may be provided and have been illustrated with outwardly extending central channels 3', 4' and 5 respectively. The portions just described may be considered as forming a main frame for the toaster. This frame may be supported by four feet 2 secured to the bottom of the base 1.

Figure 2:
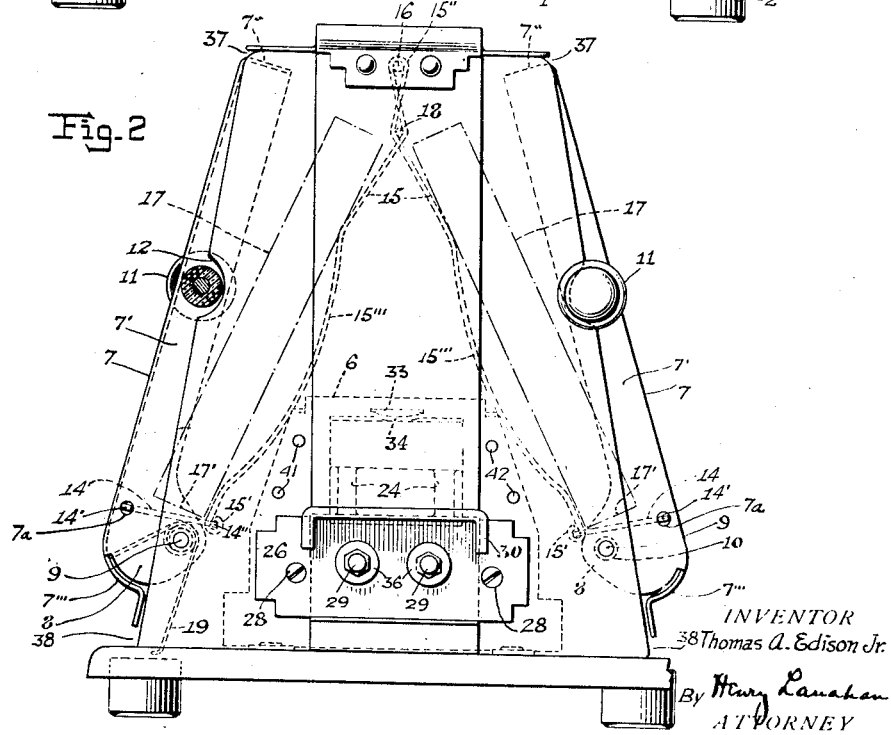
Fig. 2 is an end elevational view, partly in section, of such toaster with both toast covers closed.

Two similar toast covers 7 are arranged on opposite sides of the toaster. Each of these is formed with the end flanges 7', the top flange 7", and the incurving bottom flange 7'". The lower portions of the end flanges 7' are slightly inwardly extended to form the lug portions 8. These lug portions are pivotally assembled to lower portions of the end casings 3 and 4, as by the pivot studs 9 and spacers 10, so that each toast cover is pivoted to the frame along an axis extending longitudinally thereof. Approximately centrally of the end flanges 7' may be provided the outwardly extending knobs 11. The end casings 3 and 4 may be provided with recesses 12, and by virtue of impingement thereagainst of the knobs 11 may serve to limit inward swinging or closing movement, of the toast covers. In their extreme closed position the toast covers are, as illustrated in Fig. 2, somewhat upwardly convergent. A slot 13 may be formed at the end of each toast cover adjacent the end casing 3, between the end flanges 7' and the bottom flange 7'". In alignment with this slot is the end plate 6, which by virtue of impingement thereagainst of the base 13' of the slot may serve to limit outward swinging or opening movement, of the toast covers. In their extreme open position the toast covers are, as illustrated by the left-hand cover in Fig. 3, slightly downwardly as well as outwardly directed from their respective pivoting axes.

For holding slices of bread or toast, racks are provided within the respective covers 7. One element of each rack is a strip-like bottom member 14 hinged to the respective toast cover, the axis of said hinging being parallel with the cover-pivoting axis and disposed, when the cover is closed, outwardly thereof and preferably at a slightly higher level. Each member 14 has been illustrated as hinged to the associated cover 7 by means of longitudinally extending lugs 14' formed at each end of the member 14 and loosely engaged in holes 7a in the cover end flanges 7' adjacent the main portion of the cover. The other element of each rack is a plurality of springs 15 loosely engaging the free edge portion 14" of the bottom member 14 by virtue of the passage of a lower terminal hook portion 15' of each spring through a respective hole 14'" provided in the member 14 adjacent its inner edge. These springs are secured at their upper extremities to the frame through the medium of a rod 16 disposed near the top of the frame longitudinally and centrally thereof, about which rod may pass an upper terminal hook portion 15" of each spring.

By virtue of the disposition of their terminals the springs 15 of each rack slant upwardly toward the center of the toaster, and their length is such as to cause the respective bottom member 14 to incline downwardly toward such center and to form an appreciable angle with the springs when the corresponding toast cover 7 is closed. Obviously a slice of bread or toast if then disposed in the rack will, as illustrated by 17 in Fig. 2, rest against the springs 15 with its lower edge 17' at the apex of the member-spring angle. Throughout the major portion of the opening movement of a toast cover the axis of hinging of the member 14 to the cover is being moved away from the rod 16, and thus the member-spring angle is progressively increased toward substantially a 180 degree relation. At the same time the angle between the member 14 and the main portion of the cover 7 is being increased. It is intended that by opening of the toast cover the slice edge 17' will be caused to slide along the member 14 to the cover 7 and finally along the cover to the position illustrated in Fig. 3, it being obvious that upon re-closing of the cover the slice will occupy a reversed position in the rack. The progressive increase of the two angles above-mentioned as the cover is opened facilitates the positive performance by the slice of this sliding movement.

I provide the springs 15 with an inward bias at their lower extremities in order that they may serve the function of biasing the toast cover, when nearly closed, to a closed position. This requires that the top portions of the springs be secured against appreciable swinging or pivotal movement. I accomplish this, without rigidly securing the springs to the rod 16, by providing at a slight distance below that rod another rod 18. Reference being had to either Fig. 2 or Fig. 3, it will be seen that the springs 15 which extend from the rod 16 to the member 14 hinged to the left-hand toast cover 7 pass around the right-hand side of the rod 18, while the springs 15 which extend to the member 14 of the right-hand toast cover 7 pass around the left-hand side of the rod 18. By this construction the rod 18 is wholly supported by the springs 15, and serves to bias inwardly the lower end portions of these springs.

The springs 15 are of such length that each member 14 becomes substantially aligned with the springs to which it is connected when the associated toast cover 7 has been opened to a partial extent and while such member 14 is still slightly upwardly and outwardly disposed from the pivotal axis of said toast cover. As this cover is opened farther the member 14 must cross that pivotal axis, and the axis of the pivotal connection of the member 14 to the cover must meanwhile move slightly farther away from the rods 16 and 18. This places on the springs 15 a slight longitudinally extending force. To permit compliance with this force the springs may be provided with slightly arcuate central portions 15''' and if desired the rod 16 may be made slightly compliant; some compliance also inherently results from the resiliency of the support afforded by rod 18. These compliances permit the passage of the member 14 across the cover-pivoting axis and, just after this passage has occurred, result in a force directed upwardly along the springs from the pivotal axis of member 14. This force, being along lines now within the cover-pivoting axis, imparts an opening bias to the cover. In Fig. 3 I have indicated by A the arc of travel of the pivotal axis of member 14 and by B an arc defining the limit to which that axis may be moved without exerting an extending force on the springs 15. That portion of the arc A lying between the points C and D, since it is disposed below the arc B, represents the locus of the pivotal axis of member 14 while the extending force is exerted on the springs.

The cover-opening bias just described is of course additional to a bias inherently supplied by gravity, but since the former arises suddenly when each cover is almost fully open, it tends significantly to insure full opening of that cover before re-closing and thereby to insure the above described reversal of position of the associated slice 17.

While the springs 15 form a highly satisfactory means for biasing the toast covers 7, when almost closed, to fully closed positions, they may if desired be supplemented by conventional torsion springs 19, which may be terminally hooked to the base 1 and to the cover 7 and intermediately coiled about the spacer 10.

The heating unit is positioned entirely at a low level within the frame. If the unit be arranged as shown, substantially at the level of the bottom portions of the inclined toast racks hereinbefore described, i. e., substantially opposite the lower portions of the springs 15, the bottom inner surface portions of bread slices in the racks will obviously be efficiently toasted by direct radiation. The top inner surface portions of bread slices in the racks will of course receive less radiation per given area, but by virtue of the inclination of the racks sufficient aid is derived from convection to equalize fairly well the degree of toasting over the entire inner surface of each slice. This is particularly true if the heating unit is arranged to extend horizontally and in a position vertically beneath the top portions of the racks. Accordingly I have illustrated in the drawings a heating unit in which the heating device proper comprises a heating element or wire 21 fashioned substantially into the form of a pair of parallel helices 22 of relatively small bore, the helices being horizontally disposed at the level of the rack bottom portions and respectively lying underneath the rack top portions.

The general relation of the helices 22 to the racks is best seen in Fig. 3. It will be noted that the two racks are arranged to bring almost together the top edges of average-sized bread slices which may be disposed therein, the desirable width of the heating unit being thus reduced to a minimum. From Fig. 3 it may also be noted that the left-hand helix 22 will provide some heat by direct radiation to the central and upper portions of the right-hand rack, while being shielded from the lower portion of that rack by the block 23 (hereinafter described) on which the helices are supported. A corresponding statement as to the right-hand helix and left-hand rack is obviously also true. This is a factor further tending to equalize the degree of toasting of the lower and other surface portions of each slice.

In order to obtain the proper toasting effect by heat convection, it is desirable that with the toast covers closed suitable apertures remain at the top and bottom of the toaster through which air may circulate. Thus the toast covers may be arranged so that gaps such as 37 and 38 are left between their flanges and the frame, and such covers may further be apertured or recessed in their top portions as at 39 and 40.

A refinement designed to obtain the greatest uniformity in the degree of toasting over the entire inner surfaces of the bread slices, resides in the provision of the horizontal heat-deflecting rods 41 and 42, disposed longitudinally of the toaster between each helix 22 and lower portions of the adjacent rack. These rods may be terminally supported by end members, such as the casing 4 and the end plate 6. They intercept heat which would otherwise reach certain lower portions of the bread slices and deflect at least some of the intercepted heat to other portions of the slices. I further employ the upper of such rods, 41, 42, as a means for limiting inward movement of springs 15, tending to occur (in accordance with their inward bias) when the toast covers are substantially fully open, at which time, however, the longitudinal compliance of the springs is more effective than their inward bias, as above set forth.

The insulating block 23 on which the helices are formed and mounted is of generally rectangular shape, and is provided with two rows of transverse holes 24 respectively adjacent its longer edges 23'. The heating element 21, which may be a coil spring-like resistance element or wire, is passed in one direction through the first of one row of these holes 24, around the adjacent edge 23' of the block, in a similar direction through the next of the holes 24, and so on along one entire edge 23'. The element may then be passed across the block 23 to the second row of holes 24 and similarly passed through those holes and around the other edge 23' of the block. Thus the helices are electrically in series, and the two terminals thereof are conveniently disposed at one extremity of the block 23. It will be understood that while this manner of assembly of the heating element to the block 23, and the resulting helical nature of the heating devices, are considered convenient and desirable, I do not intend to limit thereto all aspects of my invention, it being obvious that many of its features are independent of the specific configuration of the heating device.

For greatest convenience in assembly, repair, replacement, and the like, I make the heating unit readily removable from the balance of the toaster; the removed unit appearing in plan in Fig. 4, wherein the heating element 21 is shown as a flat or round, rather than a coil spring-like resistance element. This removal is facilitated by the relatively small cross section of the heating devices proper, already described. The insulating block 23 may be formed with a lug or offset portion 25 at the end whereat are disposed the terminals of the helices 22: This offset portion may be provided at its outer face 25' with two thin circular bosses 25". A plate 26, provided with holes corresponding to the bosses 25" is placed in contact with the face 25'. Through holes in the offset portion 25 provided centrally of the bosses 25", may be passed two contact pins 29 whose outer portions are adapted to be connected with a conventional cord receptacle (not shown). These pins are provided with shoulders 29', and between these shoulders and the plate 26 are placed mica or other insulating washers 36, such washers serving both to insulate the shoulders from the plate 26 and to hold the latter against the face 25' when the pins are secured in position, as by the nuts 29". To the inner extremities of the contact pins 29 may be electrically connected the extremities of the pair of helices 22. The plate 26 may be folded over to form the inverted U-shaped guard member 30 extending outwardly over the pins 29.

An aperture 27 is provided in the end casing 4, through which the heating unit may be passed until the plate 26 impinges against the end casing 4. Here the flange may be secured, as by means of two screws 28 passed through the plate into the end casing. In this manner the block 23 is secured at one end in position in the toaster frame. The construction is such that the opposite end of the block 23, when the plate 26 impinges against the end casing 4, engages centering means provided therefor at the opposite end of the toaster, whereby it is possible for the two screws 28 to constitute the only fastening required for the entire heating unit. Such centering means is conveniently provided by an aperture 31 which is formed in the end member or plate 6 and which is adapted to be engaged by the enlarged end portion 32 of the block. Slightly above the top edge of the aperture 31, the plate 6 may be provided with a slot 33, forming a narrow strip portion 34 which may be readily bent inwardly of the aperture to insure a good fit of the block therein.

It will be understood that while I have described in detail a particular form of toaster embodying my invention, I do not intend to limit the features of my invention by the precise details of this embodiment, but rather intend to define my invention with all permissible breadth in the following claims.

I claim:

1. In an electric toaster, the combination of a plurality of toast racks mutually upwardly convergent, a horizontally extending heating device disposed between said racks at the approximate level of their bottom portions, and heat-deflecting members interposed between said device and lower portions of said racks whereby to reduce excessive radiation to such lower portions.

2. In an electric toaster, the combination of two oppositely disposed and upwardly convergent toast racks, a horizontally extending insulating block disposed between and in spaced relation to the bottom portions of said racks, and heating helices respectively disposed along opposite edges of said block adjacent said racks, the bottom portion of each of said racks being exposed to radiation from one only of said helices and other portions of each rack being exposed to radiation from both said helices.

3. The combination in an electric toaster having a frame, of an outwardly openable toast cover pivoted to said frame, a member hinged inside said cover near the pivotal axis thereof, and spring members connected between said frame and said hinged member for biasing said cover when nearly closed to its closed position and when nearly open to its fully open position, said spring members and said hinged member forming a toast rack.

4. In an electric toaster having a frame and an outwardly openable toast cover pivoted to a lower portion of said frame, a toast rack comprising a bottom member hinged at one edge portion to a lower portion of said cover and a plurality of springs terminally secured in a top portion of said frame, inwardly biased, and engaging a free edge portion of said member, said member being substantially in alignment with and exerting a slight longitudinally extending force on said springs when said cover is partially open, and said member being in angular relationship to said springs and responsive to the bias thereof when said cover is substantially closed.

5. The combination in an electric toaster having a frame, of two toast covers pivoted along parallel axes to respectively opposite lower portions of said frame for opening or closing at will, two groups of spring members terminally engaged in an upper portion of said frame substantially in a central line parallel with said pivoting axes for respectively biasing said toast covers, a rod disposed below said line, and additional rods respectively adjacent each of said groups of spring members and disposed between said first named rod and said cover pivots substantially parallel to said axes, the said spring members of said two groups respectively being curved around opposite sides of said first named rod and respectively limited in movement by one of said additional rods upon the opening of said cover and thereby acquiring a bias.

6. The combination in an electric toaster having a frame, of two toast covers pivoted along parallel axes to respectively opposite lower portions of said frame, two groups of spring members terminally engaged in an upper portion of said frame substantially in a central line parallel with said pivoting axes for respectively biasing said toast covers, and a rod disposed below said line, the spring members of said two groups respectively being curved around opposite sides of said rod and thereby acquiring a bias, and said spring members constituting supporting means for said rod.

7. In an electric toaster having a frame, an outwardly openable toast cover pivoted near its bottom to a lower portion of said frame, and an inclined toast rack comprising a plurality of side members terminally secured in an upper portion of said frame and a bottom member engaged along one edge portion by said side members and hinged along its opposite edge portion within a lower portion of said cover, the axis of said hinging being parallel to the pivotal axis of said cover and being outwardly disposed therefrom when said cover is closed whereby the angles formed by said bottom member with said cover and with said side members are each increased as said cover is opened.

8. In an electric toaster having a frame and an outwardly openable toast cover pivoted to a lower portion of said frame, a toast rack connected between a lower portion of said cover and an upper portion of said frame and including a plurality of inwardly biased spring members adapted to bias said cover, a horizontally extending heating element disposed within said frame, and a horizontally extending heat-deflecting rod disposed between said element and a portion of said rack, said rod constituting means for limiting inward movement of said spring members.

9. A heating unit for an electric toaster comprising a substantially rectangular block of insulating material having an offset portion at one extremity and provided with transverse holes arranged in two rows respectively slightly spaced from its opposite sides, two contact pins secured in said offset portion, and a heating element connected at one extremity to one of said contact pins, helically wound through said holes and about the respective adjacent sides of the block, and connected at its other extremity to the other of said contact pins.

THOMAS A. EDISON, JR.